July 24, 1923.
F. H. PETERSEN ET AL
1,462,979
COMBINED CRANK SHAFT TURNING TOOL AND AUTOMATICALLY RECIPROCATING
MECHANISM FOR SUPPORTING AND OPERATING THE SAME
Filed Sept. 2, 1921  2 Sheets-Sheet 1
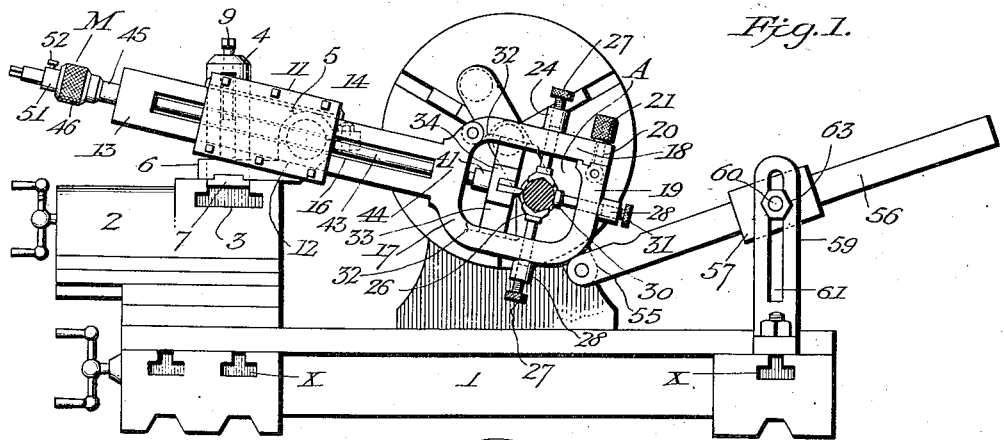
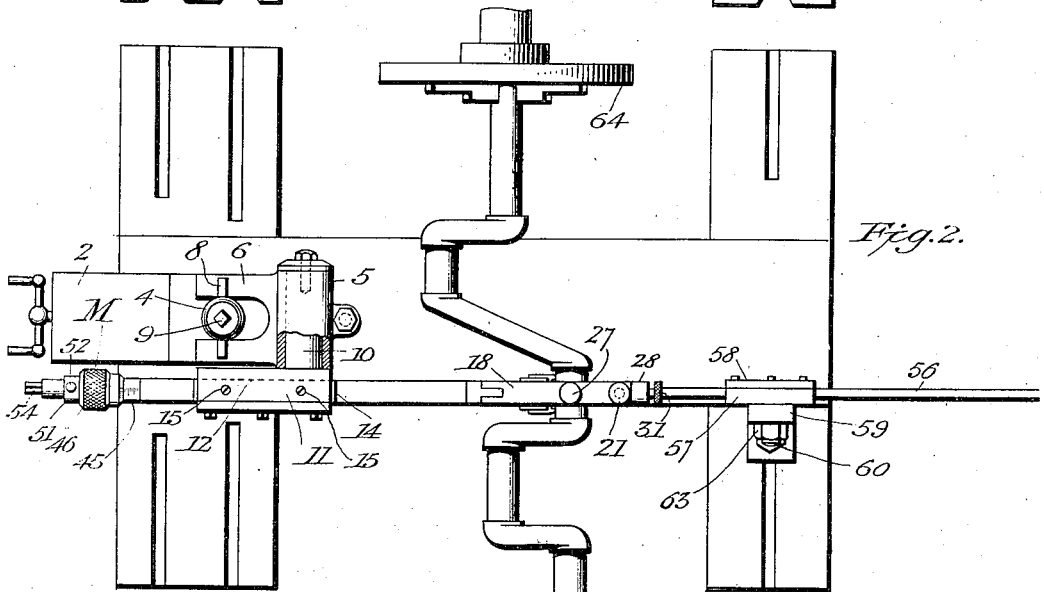
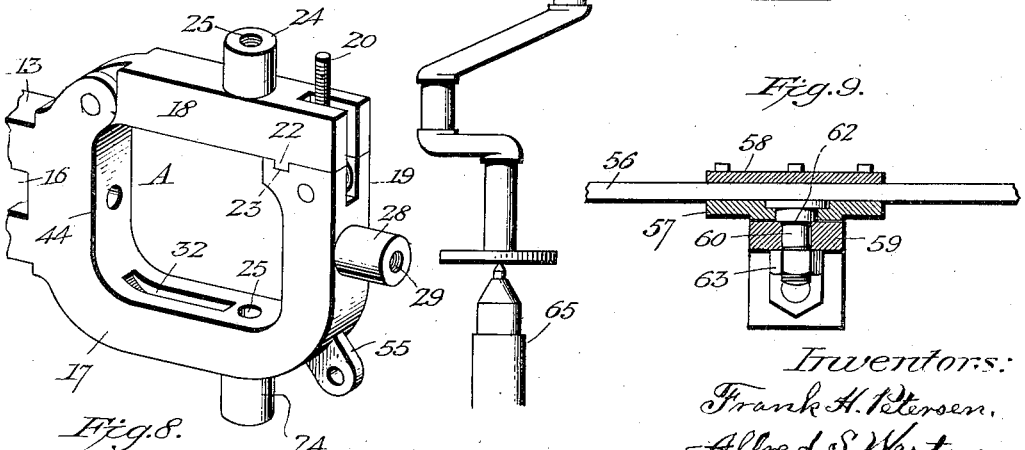

July 24, 1923.
F. H. PETERSEN ET AL
COMBINED CRANK SHAFT TURNING TOOL AND AUTOMATICALLY RECIPROCATING
MECHANISM FOR SUPPORTING AND OPERATING THE SAME
Filed Sept. 2, 1921
1,462,979
2 Sheets-Sheet 2
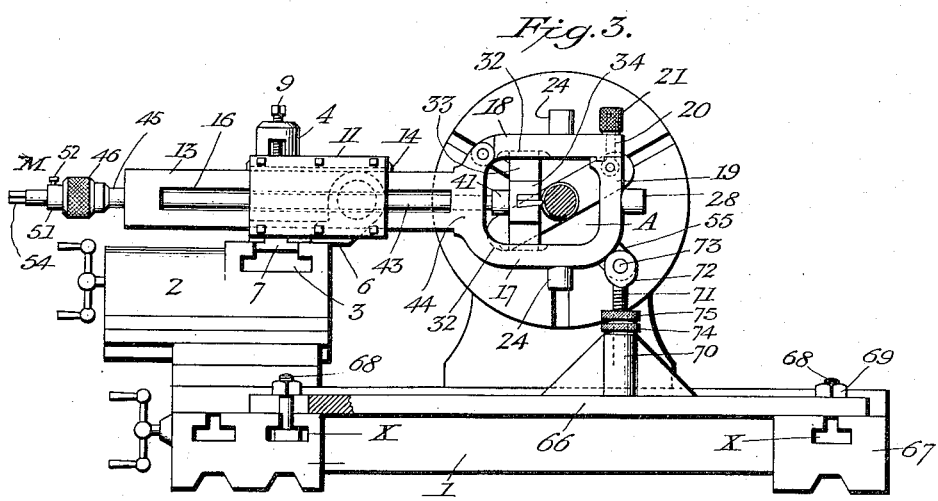
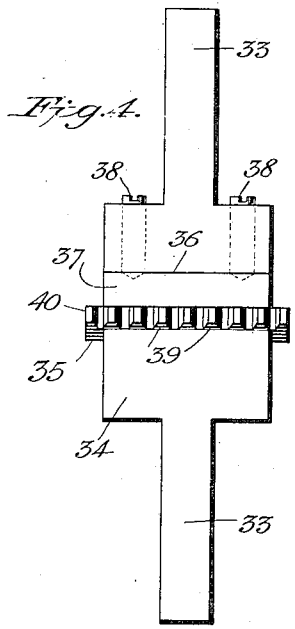
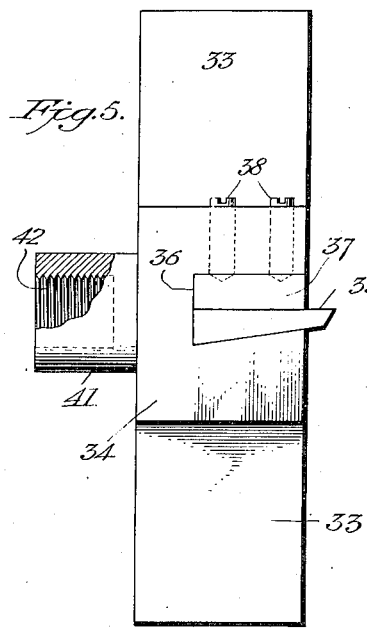
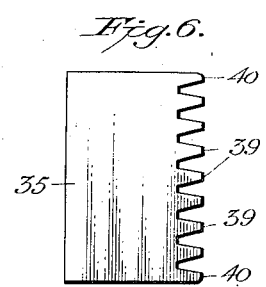
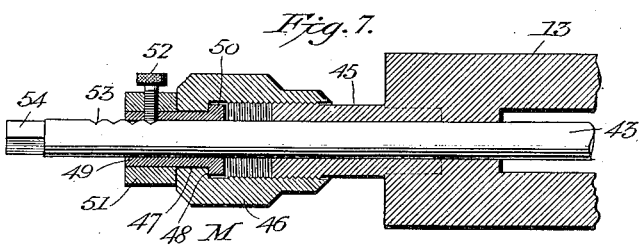

Patented July 24, 1923.

1,462,979

UNITED STATES PATENT OFFICE.

FRANK H. PETERSEN AND ALFRED S. WESTON, OF DENVER, COLORADO.

COMBINED CRANK-SHAFT-TURNING TOOL AND AUTOMATICALLY RECIPROCATING MECHANISM FOR SUPPORTING AND OPERATING THE SAME.

Application filed September 2, 1921. Serial No. 498,001.

*To all whom it may concern:*

Be it known that we, FRANK H. PETERSEN, a citizen of the United States of America, residing at the city and county of Denver and State of Colorado, and ALFRED S. WESTON, a subject of the King of Great Britain, but residing in the city and county of Denver and State of Colorado, have invented a new and useful Combined Crank-Shaft-Turning Tool and Automatically Reciprocating Mechanism for Supporting and Operating the Same, of which the following is a specification.

Our invention relates to a new and improved combined crank shaft turning tool and automatically reciprocating mechanism for supporting and operating the same.

And the objects of our invention are:

First. To provide a multiple point metal cutting tool and a support for the same, that cuts a chip from the wrist pins and the bearings of crank shafts.

Second. To provide a multiple point metal cutting tool that has a support that moves reciprocally and in the same circular path as the crank shaft and that holds the multiple cutting point tool in chip cutting relation to the wrist pin and journal bearings of the crank shaft. And Third. To provide a multiple point metal cutting tool that has a support that moves reciprocally and in the same circular path as the crank shaft and that holds the multiple cutting point tool in chip cutting relation to the wrist pin and journal bearings of the crank shaft, said reciprocating support being secured to the tool holder of the compound rest of the carriage of a lathe in such a manner as to have an automatically operating reciprocal, and also at the same time a rocking, movement, and that is so arranged as to surround and drive the adjustable back rest bearings against the opposite side portions of the wrist pins being turned and trued up, so that the chip cutting tool bears in chip cutting relation against the wrist pins at all times during their combined circular and reciprocal throw movements.

We attain these objects by the mechanism illustrated in the accompanying drawings, in which:

Figure 1 is a side view, showing the manner of supporting the improved mechanism upon a lathe, and connecting it to the crank pin of a crank shaft which is centered in the said lathe.

Fig. 2 is a plan view of Figure 1.

Fig. 3 is a side elevation, showing the manner of supporting the mechanism upon a lathe when truing the bearing pins of a crank shaft which is centered in the lathe.

Fig. 4 is a front view of the chuck for holding the improved cutting tool.

Fig. 5 is a side view of Figure 4, showing the manner of clamping the cutting tool in the chuck.

Fig. 6 is a plan view of the improved cutting tool.

Fig. 7 is a sectional view of the micrometer by which the cutting tool is moved into engagement with either the crank pin or bearing pin to be trued.

Fig. 8 is a perspective of the head end of the slide bar, and

Fig. 9 is a detailed, horizontal, sectional view of the co-operating guide mechanism for the slide bar shown in Fig. 8.

Referring to the accompanying drawings:

The numeral 1, indicates the carriage of a common form of engine lathe, and 2, the usual tool post supporting and cutting tool feeding compound rest, which is adjustably mounted on the carriage and has a movement at right angles to that of the carriage. The compound has a T-slot, 3, in which is mounted the ordinary slotted tool post 4, and to the upper face of the compound is clamped a bearing block 5, having a lateral, bifurcated base 6, which straddles the tool post 4, and is provided on its under side with a rib or tongue 7, which lies in the T-slot 3, and prevents a twisting movement of the block upon the compound. A metal clamping strip 8, is passed through the slot in the tool post 4, and is clamped upon the base 6, by a bolt 9, which is screwed in through the end portion of the post and upon the strip 8, thus rigidly securing the bearing block to the compound. Within the bearing block 5, is pivotally mounted the trunnion 10, of a guide block 11, which is rectangular in form, and is provided with a longitudinal slideway 12, which extends in from the face of the block a distance equal to about half its thickness. A slide bar 13, is mounted in the slideway 12, and a shim 14, is interposed between the upper edge of the slide bar and the adjacent face of the slideway, and is held against the slide bar by screws 15, as shown. The shim is adjusted to take up wear between the bar and slideway, thus maintaining a proper sliding fit between the parts. This slide bar is provided with a longitudinal slot or opening 16, which extends to within a short distance of each end of the bar, and on one end of the bar is formed a substantially U-shaped extension 17, to the inner end of which is hinged an arm 18, the free end of which is bifurcated and normally rests on the outer end member 19, of the extension 17. An eye bolt 20, is pivotally mounted in the upper end of the member 19, and extends through the bifurcated end of the arm 18, when the latter is closed, and a thumb nut 21, is screwed upon the bolt and against the bifurcated end of the arm 18, thereby holding the arm in closed position. A rib 22, is formed on the under side of the free end of the arm 18, which fits in a groove or recess 23, in the adjoining edge of the end member 19, and holds the arm securely against a longitudinal slipping movement. The parts 17 and 18, together form a rectangular frame or head A, through which the crank pins or the bearing pins of a crank shaft extend when undergoing the truing operation, and each of the parts 17, and 18, is formed with a laterally projecting lug 24, in each of which is formed an axial hole 25, which also extend through the parts 17 and 18, respectively; the parts of the holes extending through the lugs being threaded, while the remainder of each hole is unthreaded. Into the unthreaded parts of the holes 25, are inserted the shanks of V-shaped clamps 26, which lie within the head A, and thumb screws 27, are screwed into the lugs and against the end of the shanks of the clamps 26, to clamp them upon the crank pin of a crank shaft, as will hereinafter more fully appear.

The end member 19, of the head A, is also provided with a lug 28, having an axial hole 29, which also extends through the member 19; the part of the hole extending through the lug being threaded, while the remainder of the hole is unthreaded. Into the unthreaded part of the hole 29, is inserted the shank or stem of an abutment block 30, which is adapted to bear against the crank pin to be re-trued, at a diametrically opposite point from the cutting tool, and a thumb screw 31, is screwed into the lug 28, and against the shank of the abutment block 30, to hold the same in engagement with the crank pin.

The opposing faces of the arms 17 and 18, of the head A, are provided with longitudinal guideway recesses 32, in which rest the opposite ends of short, flat arms 33, which project from opposite sides of a block or body 34, which, with the arms 33, constitutes a chuck for holding a cutting tool 35. A deep recess 36, is formed in the front face of the block 34, and extends the full width of the block. The top wall of this recess is at right angles to the end or back wall thereof, but its bottom wall has a slight upward inclination from the said back wall. The cutter 35, rests upon this inclined bottom wall, and, its bottom face is inclined at a corresponding angle to that of the said bottom wall, while its upper face is parallel with the upper wall of the recess. A clamp plate 37, fits snugly in the space between the cutter and the upper wall of the recess 36, and this plate is clamped against the cutter by screws 38, which are screwed down through the block 34, and into shallow holes or indentations in the plate 37.

The cutter 35, is slightly longer than the width of the block 34, as shown by Figure 4, and its front edge is beveled as shown, and is recessed or notched to provide a plurality of spaced, tapered teeth 39, the straight cutting edges of which are in a line parallel with the back edge of the cutter. The cutting edges of the two end teeth 40, are rounded, as shown, so as to conform to the fillet at each end of the pin, as will be understood.

Upon the rear face of the block 34, is formed a lug 41, having a threaded axial hole 42, into which one end of a rod 43, is screwed. The rod 43, passes through the adjacent end 44, of the slide bar 13, and into and through the slot 16, in the said bar, and through a tubular extension or nipple 45, on the opposite end of the said slide bar. This extension 45, may form an integral part of the slide bar, as shown in Fig. 7, or it may, if desired, be screwed into the end of the slide bar. This extension forms part of a micrometer gauge M, and its end portion is threaded to receive an elongated, hollow thumb nut 46, having a threaded bore which terminates near the outer end of the nut, in a smooth bore 47, of less diameter than the threaded bore, an end wall 48, being formed at the junction of the two bores. A bushing 49, surrounds the shaft 43, and extends through the smooth bore 47, this bushing having an annular flange 50, which bears against the end wall 48, of the nut. A collar 51, surrounds that part of the bushing which projects beyond the end of the nut, and also bears against this end of the nut, and a thumb screw 52, enters a threaded aperture in the collar and in the bushing, and its end engages one of a series of notches 53, formed in the rod 43, thereby securing the bushing rigidly to the rod. By turning the nut 46, on the tubular extension 45, the rod 43, can be moved forward to cause the cutter 35, to engage a crank pin or a bearing pin, as the case may be, the extension 45, and the nut 46, being formed with cooperating graduation marks, which indicate the minutest adjustment of the rod. The outer end of the rod 43, is squared, as shown at 54, to receive a wrench, by means of which the opposite end of the rod can be screwed into the threaded hole of the lug 41, on the cutter holding chuck 34.

The forward portion of the bottom member 17, of the slide bar head A, is provided with an apertured ear 55, to which one end of a slide bar 56, is secured. This bar passes through a guide block 57, in which it is held by a cap 58, the block having a swiveled connection with an upright or standard 59, which is bolted to one of the side members of the lathe. The swivel connection is effected by means of a flanged bolt 60, which passes through the back of the block and through a vertical slot 61, in the standard 59. The bolt 60, is provided with a shoulder 62, which bears against one side of the standard, and a nut 63, is screwed upon the bolt and against the other side of the standard, whereby the bolt may be clamped to the standard in any desired position in the slot 61, without affecting the swivel action of the guide block 57, as will be understood by reference to Fig. 9.

The slide bar 56, and its guide block 57, cooperate with the guide block 11, in preventing lateral variations of the slide bar 13, throughout the extent of its reciprocating movements, as will be understood by reference to Fig. 1.

The crank shaft to be re-trued is supported in the usual chuck and tail stock 64 and 65, of the lathe, and on the true center line of its bearing pins, and the head A, of the slide bar 13, is secured to either a crank pin or bearing pin, in the following manner:

The thumb nut 21, is unscrewed from the eye bolt 20, and the arm 18, is swung back to permit the pin to be inserted in the head. The arm 18, is then swung again to position shown in Fig. 1 and clamped in place by the nut 21. When a crank pin is to be re-trued, the said pin is clamped between the V-shaped clamps 26, so that the axis of the pin may be in line with the axis of the rod 43, or slightly above or below the axis of the said rod, as conditions may warrant. The abutment 30, is then moved into engagement with the pin, by the thumb screw 31, and this position of the pin with respect to the head A, and the axis of the rod 43, is maintained by the clamps 26 and abutment 30, throughout the re-truing operation of the pin.

In operation, the crank shaft is supported in the lathe, as above described, and when a crank pin is to be retrued, the head end of the slide bar 13, is secured upon the said pin in the manner above described. The cutter 35, is then adjusted by the micrometer to engage the pin, and the lathe is started. The crank shaft is turned upon its axis at a relatively slow speed, and the slide bar is thereby slid back and forth in the slide block 11, a distance corresponding to the throw of the crank, and at the same time the guide block is rocked in its bearing in the block 5. The slide bar 56, also reciprocates in its guide block 57, which has a swivel connection with the standard 59, thereby cooperating with the block 11, in steadying the movement of the slide bar 13. The cutter 35, is fed against the crank pin by the micrometer until the necessary amount of the surface of the pin has been removed to correct any irregularity or unevenness therein, and as the crank shaft turns on its true axial center, and the axis of the guide bar 13, maintains the same position relatively to the axis of the pin throughout, the re-truing operation, it will be seen that when re-trued the surface of the pin will not only be level throughout, but concentric with its axis, the lathe carriage being adjusted to move the cutter over the whole length of the pin.

When a bearing pin is to be re-trued, the mechanism is arranged as follows:

The bearing pin is positioned within the head A, in the manner above described, but the V-shaped clamps 26, and the abutment block 30, are dispensed with, and the slide bar 13, is adjusted and held stationary in the following manner: A flat supporting bar 66, is secured to the opposite side members 67, of the lathe, by bolts 68, the heads of which are inserted in the usual T-slots X, in the said sides of the lathe, the threaded shanks of the bolts passing through slots in the bar 66, and receiving nuts 69, which are screwed down against the bar, as shown in Fig. 3. The bar is provided with an upright lug 70, having an unthreaded axial hole in which is inserted a threaded stem 71, the upper end of which is formed with a bifurcated head 72, which is adapted to receive the apertured ear 55, on the head A of the slide bar 13, and to be connected thereto by a pin 73. The stem 71, receives an adjusting nut 74, which rests upon the top of the lug 70, and also a jam nut 75, which rests upon the nut 74. By turning the nut 74, the slide bar 13, which is now supported in a substantially horizontal position, may be rocked on the trunnion 10, to adjust the cutter 35, to the required position relatively to the axis of the bearing pin, and when the proper position of the cutter is determined, the jam nut 75, is turned down against the adjusting nut 74, and the slide bar 13 is held absolutely stationary against both a horizontal movement in the guide block 11, or a rocking movement on the trunnion 10.

As the crank shaft rotates, the cutter 35, is moved against the bearing pin by the micrometer, and, over the whole length of the pin by the movement of the lathe carriage, until all unevenness in the surface of the pin has been removed and the whole surface of the pin is concentric with the true axial center of the shaft.

It will be noted that the trunnion 10, on the guide block 11, is in a position adjoining the inner end of the block. This arrangement leaves a greater space between the inner end of the block 11, and the head A, than would be the case if the trunnion were placed in the center of the block, and thus permits a crank shaft having the greatest length of crank throw to be trued, without bringing the head A, of the slide bar 13, into engagement with the end of the block 11 on the backward sliding movement of the said bar. It will thus be seen that the device is adopted to the re-truing of both crank pins and bearing pins of crank shafts, and that in either case, the position of the cutter with respect to the axis of the shaft is maintained throughout the re-truing operation.

Having described our invention, what we claim as new and desire to secure by Letters Patent, is:

1. In a device of the character described an adjustable support, a swivel block mounted thereon, a slide bar mounted in said block having an open head on its forward end adapted to surround a pin of a crank shaft, V-clamp in said head for engaging said pin to maintain a fixed relation between the axis of said pin and the axis of said bar, a swiveled support, a bar mounted therein and pivotally connected at one end to the said open head to prevent lateral variations of the same; a chuck slidably mounted in said open head; a rod extending through the first mentioned slide bar and connected to said chuck; threaded means for moving said rod back and forth, and a cutter in said chuck adapted to engage said pin.

2. In a device of the character described, an adjustable support, a swivel block mounted thereon, a slide bar mounted in said block, having an open head on its forward end adapted to surround a pin of a shaft, and means for securing said head to said pin so as to permit turning of the pin; of a chuck slidably mounted in said open head, a rod extending through said slide bar and rigidly connected to said chuck, a cutter in said chuck, threaded means for imparting a longitudinal movement to said rod to cause said cutter to engage said pin, and means for preventing lateral variation of the head end of said slide bar.

3. In a device of the character described, an adjustable support, a swivel block mounted thereon, a slide bar mounted in said block having a frame like head on one end, one of the longitudinal sides of which is hinged to said bar, and means for holding said hinged side in a closed position; a chuck slidably mounted in the longitudinal side members of said head, a rod extending through said bar and connected at its forward end to said chuck; a cutter secured in said chuck; a threaded nipple on the opposite end of said bar, through which said rod passes; a flanged sleeve rigidly secured upon said rod; a nut threaded to said nipple and surrounding said sleeve and having a shoulder which engages said flange, whereby, when the nut is turned, the rod is moved longitudinally, and means for connecting said head to a crank shaft pin so as to permit said pin to turn therein.

4. In a device of the character described, a bar having a frame like head on one end, one side member of which is hinged to said bar and means for securing said side member in a closed position; a chuck slidably mounted in said side; a cutter mounted in said chuck; a rod extending through said bar and rigidly connected at its forward end to said chuck; an externally threaded nipple on the opposite end of said bar, through which said rod passes; a flanged sleeve secured upon said rod beyond said nipple; a collar on said sleeve; a nut threaded to said nipple and surrounding said sleeve between said collar and said flange, whereby, when the nut is turned, the rod is moved longitudinally, and clamps in said head, comprising diametrically opposite adjustable V-blocks, and an adjustable abutment block at right angles to said V-blocks, whereby a cylindrical, rotating object can be supported in said head in rotation to said cutter.

5. In a device of the character described, a swiveled support, a bar slidably mounted in said support, having an open head adapted to surround a pin of a shaft, a chuck slidably mounted in said head, a rod extending through said bar and connected to said chuck, a toothed cutter in said chuck, a micrometer mechanism connected with said rod for moving the same to cause the cutter to engage said pin, and means for maintaining a fixed relation between the axis of said rod and the axis of said pin.

6. In a device of the character described, an adjustable support; a swivel block mounted on said support; a bar slidably mounted in said block, having an open head on one end for surrounding a crank shaft pin; clamping means for securing said head to said pin so as to maintain a fixed rotation between the axis of said pin and the longitudinal axis of said bar; a cutter slidably mounted in the head, and means for adjusting the same with respect to the said pin; of means for preventing lateral variations of the head, comprising an adjustable swivel block, a bar slidably mounted in the same, one end of which is pivotally connected to said head.

In testimony whereof we affix our signatures in presence of two witnesses.

FRANK H. PETERSEN.
ALFRED S. WESTON.

Witnesses:
G. SARGENT ELLIOTT,
EMILY ROBERTS.